Feb. 22, 1938.  A. E. ORNER  2,108,972
VEGETABLE SLICER
Filed Aug. 11, 1936  2 Sheets-Sheet 1
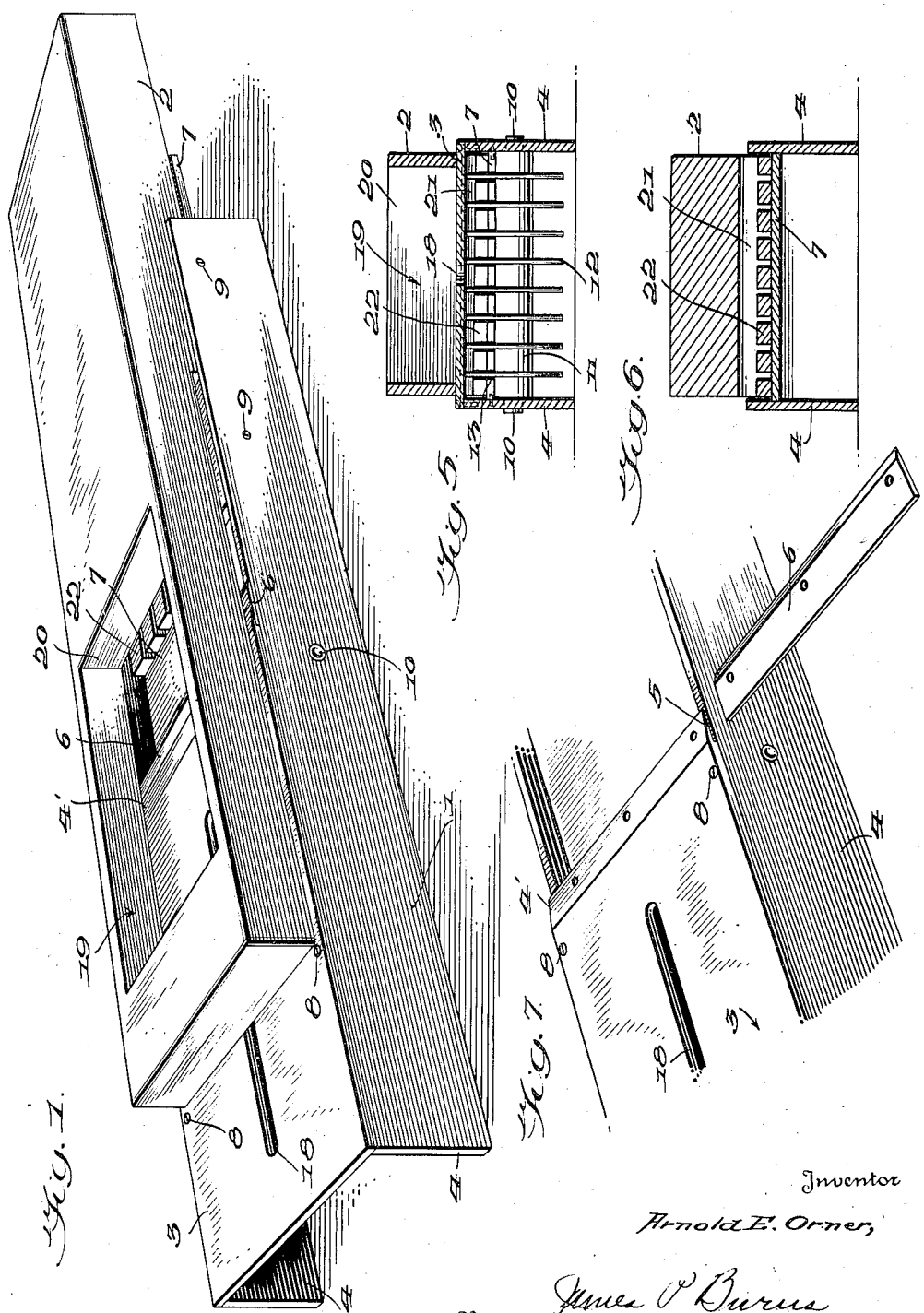
Inventor
Arnold E. Orner,
By James P. Burns
Attorney Feb. 22, 1938.　　　A. E. ORNER　　　2,108,972
VEGETABLE SLICER
Filed Aug. 11, 1936　　　2 Sheets-Sheet 2
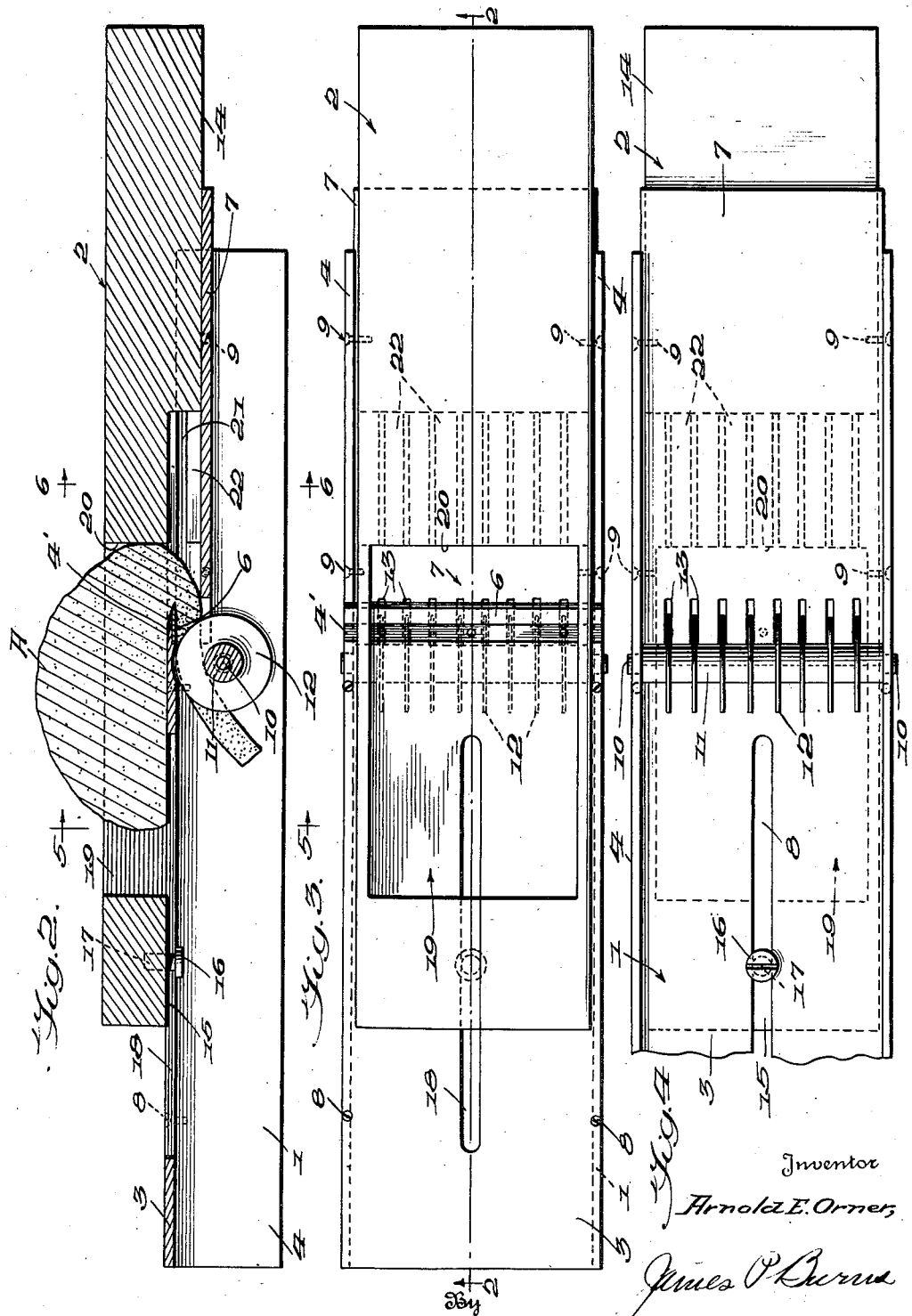
Inventor
Arnold E. Orner
By James P. Burns
Attorney Patented Feb. 22, 1938

2,108,972

UNITED STATES PATENT OFFICE 2,108,972

VEGETABLE SLICER

Arnold E. Orner, Bendersville, Pa.

Application August 11, 1936, Serial No. 95,471

1 Claim. (Cl. 146—168)

This invention relates to a vegetable slicer and more particularly to a device which is especially adapted for slicing potatoes in a form to be "French-fried."

I am not unmindful that mechanical devices for slicing potatoes to produce forms suitable for "French-frying" have been heretofore provided. However, devices for this purpose with which I am familiar are either extremely cumbersome and expensive affairs or are open to the objection that they are dangerous to operate because of the likelihood of the operator cutting his finger.

It is an object of the present invention to provide an improved and economical vegetable slicer that entirely obviates the likelihood of injury to the operator.

It is a further object of the invention to provide a vegetable slicer that will not become clogged or jammed with slices cut from the potato or like vegetable.

It is a further and more specific object of the invention to provide a vegetable slicer embodying means for holding and guiding the vegetable being sliced while the same is moved with respect to the cutting blades.

Other advantages and objects of the invention will become apparent from the following detailed description taken in connection with the accompanying drawings, wherein:

Figure 1 is a perspective view of my improved vegetable slicing device;

Figure 2 is a longitudinal cross-sectional view taken centrally of Figure 1;

Figure 3 is a top plan view of the device as shown in Figure 1;

Figure 4 is a fragmentary bottom plan view of the device shown in Figure 1;

Figure 5 is a cross-sectional view taken on the line 5—5 of Figure 2;

Figure 6 is a cross-sectional view taken on the line 6—6 of Figure 2; and

Figure 7 is a fragmentary detailed view showing the manner of mounting the horizontal blade.

Referring to the drawings and more particularly to Figure 1, my improved vegetable slicing device embraces the body portion 1 and the slide 2. The body portion comprises the top plate 3 and the side walls 4. The top plate 3 extends about two thirds of the length of the body portion 1, as more particularly shown in Figure 2, and terminates in a beveled edge 4' notched at its under side at 5 (see Figure 7) to receive the horizontal cutting blade or knife 6. Forwardly of the top plate 3 and spaced below the same there is mounted, between the side walls 4, a second plate 7 which may advantageously extend beyond the side walls 4. Plates 3 and 7 are vertically spaced apart a distance equal to the thickness of the slice that is to be taken from the potato or like vegetable. The top plate 3 is held in position on the side walls 4 by the vertical screws 8 while the plate 7 is held in position by the transverse screws 9.

Immediately below and slightly to the rear of the horizontal cutting blade 6 there is positioned a rotary cutter embracing the shaft 10, spacing members 11, and cutting discs 12. The cutting discs 12 are spaced apart the requisite distance to form therebetween slices of the required thickness. The plate 7 is provided with longitudinal slots 13 at the end thereof adjacent the cutting roller, which slots accommodate the rotating discs 12 (see particularly Figure 4).

Coming now to a detailed description of the slide 2, it will be observed that the lower face of this slide lies in two planes, the surface 14 riding on the top of the plate 7 and the surface 15 riding on the top of the plate 3. The slide 2 is mounted in position by the removable guide pin 16 adapted to be screwed into the bottom of the surface 15 of the slide 2, as indicated at 17 in Figure 2. The guide screw 16 has an enlarged head, and the shank of the screw 16 rides in the guide slot 18 in the top plate 3. The guide pin 16 not only serves to secure the slide 2 in position on the body 1 but also serves to limit the relative longitudinal movement of the slide with respect to the body portion since the shank of the pin 16 strikes the ends of the slot 18 and the length of the slot 18 defines the limits of the longitudinal movement of the slide 2 with respect to the body portion 1.

Additionally, the slide 2 is provided with the opening 19 for receiving the vegetable, such as a potato or the like, to be sliced. The rear wall 20 of the opening 19 is adapted, when the slide 2 is moved to the left, as shown in Figure 2, to the limit of its movement in this direction, to extend a substantial distance beyond the edge of the cutting blade 6. To accommodate this movement, the slide 2 is cut away at 21, and that portion of the slide 2 below the cut-away portion 21 is sub-divided into a plurality of longitudinally extending fingers 22. These fingers 22 are adapted, when the slide 2 is moved to the left in Figure 2, to be projected between the cutting discs 12 and to thereby preclude the possibility of the rotary cutter becoming clogged by virtue of the jamming of portions of the sliced vegetable therein. These fingers 22 are particularly advantageous when an irregularly shaped vegetable is being sliced and when the horizontal knife 6 initially severs an irregularly shaped portion from the vegetable.

In the operation of the device, a potato or the like, indicated generally at A in Figure 2, is placed in the opening 19 of the slide 2 with the slide at the right-hand limit of its movement. In this position the potato drops down onto the plate 7, the slide 2 is then pushed forwardly, and the horizontal knife 6 effects a horizontal or transverse cutting of the vegetable while the rotating discs 12 substantially simultaneously effect a vertical slicing of the portion of the vegetable severed by the cutting blade 6. The fingers 22 then advance between the rotating discs 12 and positively project the severed slices from the device. The screw 16 in cooperation with the guide slot 18 limits the movement of slide 2 in each direction. The arrangement is such that guide pin 16 strikes the end of the slot 18 just before the edge of the cutting blade 6 strikes the rear face of the cutout portion 21 of the slide 2. This avoids dulling the edge of the blade 6 by repeated contacts with the slide 2.

The entire device is extremely simple in construction and easy to operate. The body portion 1, it will be observed, is in the nature of a channel-like member with the bottom portion thereof open so that, when the device is set upon a receptacle, the sliced vegetables are discharged directly thereinto. Obviously the slide 2 may be provided with a handle to facilitate its operation, and the body portion 1 may be provided with instrumentalities for attaching the same to a suitable receptacle for receiving the sliced vegetables.

It will be observed that the cutting elements, namely, the horizontal blade 6 and the cutting discs 12, are readily removable for sharpening or replacement. The blade 6 is adapted to be seated in position in the slot 5 between the beveled portion 4' of the top plate 3 and the side walls 4 of the body portion. It can be removed by merely taking out the screws used to hold it in position. The discs 12 can be removed by taking out the shaft 10 on which they are mounted.

From the foregoing description, it will be apparent that I have devised a novel and efficient vegetable slicing device that can be operated with ease and safety. It is to be understood that the foregoing specific description is illustrative only of the invention and is not to be construed in a limiting sense, the scope of the invention being that comprehended by the appended claim.

Having thus described my invention, what I claim is:

A vegetable slicing device comprising a body portion having horizontally extending plates lying in two vertically spaced planes and overlapping at their adjacent edge portions, a horizontal cutting blade carried by said overlapping edge portion of the uppermost plate, the overlapping edge portion of the lowermost plate having spaced slots extending at right angles to and terminating at their inner ends substantially in vertical alignment with the cutting edge of said horizontal blade, a plurality of rotary cutting blades positioned beneath the upper horizontal plate and rotating partly within said slots, said rotary blades being positioned relative to the edge of the horizontal cutting blade so as to act on the vegetable slice after it is cut by the horizontal blade, and a slide having surfaces cooperatively arranged with respect to said vertically spaced plates, said slide having a vegetable receiving opening in the portion cooperating with the uppermost plate and a plurality of transversely spaced, longitudinally extending fingers carried by the portion which cooperates with the lowermost plate and adapted, when the vegetable opening has passed by the horizontal cutting blade, to pass beneath the said horizontal blade and between the rotary cutting blades to effect completion of the cutting of the slice into strips and to free said strips from the spaces between said rotary blades.

ARNOLD E. ORNER.